United States Patent [19]

Yanagida

[11] Patent Number: 4,884,554
[45] Date of Patent: Dec. 5, 1989

[54] SPIT ROASTER

[75] Inventor: Satoshi Yanagida, Nagoya, Japan

[73] Assignee: Yanagen Company Ltd., Nagoya, Japan

[21] Appl. No.: 227,855

[22] Filed: Aug. 3, 1988

[30] Foreign Application Priority Data

Apr. 5, 1988 [JP] Japan .................................. 62-84867

[51] Int. Cl.⁴ .......................... F24C 15/32; A47J 37/00
[52] U.S. Cl. ................................ 126/21 R; 126/25 R;
126/299 R; 98/115.1
[58] Field of Search ................. 126/21 A, 21 R, 25 R,
126/25 AA, 299 R, 299 D, 299 C, 41 R, 39 R;
99/400, 446, 450

[56] References Cited

U.S. PATENT DOCUMENTS

| | | | |
|---|---|---|---|
| 3,151,607 | 10/1964 | Brouillard | 126/299 R |
| 3,327,697 | 6/1967 | Berlant | 126/25 R |
| 3,712,819 | 1/1973 | Field | 126/299 R |
| 4,432,274 | 2/1984 | Kurotaki | 126/299 E |
| 4,582,046 | 4/1986 | Yamada | 126/299 R |

Primary Examiner—James C. Yeung
Attorney, Agent, or Firm—Schwartz & Weinrieb

[57] ABSTRACT

Provided is a spit roaster comprising: a body having an opening communicating with an exhaust duct, formed at the center of the bottom wall thereof, and an air supply path defined at both ends thereof with respect to the longitudinal direction thereof and having an upper and a lower opening, a range case removably housed within the above body with required clearances therearound; a range removably housed within the above range case having a charcoal receiving space defined therein and support members disposed at both ends thereof with respect to the longitudinal direction thereof for supporting members for mounting materials to be cooked; and smoke exhaust frames communicating with the above exhaust duct, removably disposed upon the upper opening of an exhaust space defined between the rear side wall of the range case and the body, and having smoke exhaust inlets defined within the front sides thereof facing toward the range case.

15 Claims, 4 Drawing Sheets

SPIT ROASTER

FIELD OF THE INVENTION

This invention relates to a spit roaster employing charcoal as a fuel for spit-roasting, and more particularly to a roaster which defines a favorable cooking space and wherein smoke generated during roasting over the charcoal fire is exhausted through means of a duct and which also achieves simplified and real charcoal fire roasting requiring no more labor than replenishing smoke exhausts inlets defined within new charcoal and collecting the formed ash.

BACKGROUND OF THE INVENTION

Generally, for achieving spit roasting where chicken and the like are roasted on a spit, a roaster comprising a gas burner employing a gas as a heat source and a pair of support bars disposed above the gas burner is used. Such a roaster is designed to achieve roasting of spitted meats and the like over the gas burner by placing the spits across the support bars disposed above the gas burner with a predetermined distance defined therebetween.

A spit roaster employing a gas as a heat source enjoys wide use, since it requires a simple operation for old or consumed charcoal with, and also a sufficient caloric or heat input can be obtained. However, flames generated during combustion of the gas may have a high surface temperature, but they cannot send sufficient heat to the internal portions of the meata because of the wavelength characteristics to the gas. For such reason, the above construction involves a problem in that the surface of the meat will be burned or overcooked before sufficient heat goes through the meat as one may desire. In this respect, the use of a charcoal fire as a heat source for spit-roasting provides an advantage in that a sufficient amount of heat permeates the center of the meat by virtue of infrared rays emitted from the charcoal during burning. Moreover, the surface temperature of the charcoal fire is not very high, so that there is a relatively small possibility that the surface of the meat will be burned. Accordingly, it is well known through experience that the optimum waay of roasting a meat is to roast it over a charcoal fire in order to enhance the flavor of the meat. However, it has actually been difficult to use charcoal in an ordinary spit-roasting restaurant where the pursuit of profit is of primary importance due to the difficulty in controlling the caloric or heat output of the charcoal fire and the like, although it may be used domestically wherein considerable personal labor may be required in order to control the caloric or heat output. Furthermore, a large amount of smoke will be generated during roasting of the meat over the charcoal fire and such quickly permeates a small cooking space so as to deteriorate the cooking environment, and tends to continue spreading throughout the dining rooms of the restaurant so as to disadvantageously generate an offensive atmosphere for the visitors, or partrons. Still further, the use of a charcoal fire requires troublesome considerations, such as for example sufficient ventilation and the like when it is used within closed dining rooms of the restaurant since the charcoal generates harmful carbom monoxide gas during the initial stage of its burning. Thus, under the present circumferences, charcoal is not substantially used in restaurants in spite of a the known fact that the optimum way of roasting a meat is the use of charcoal fire.

OBJECT OF THE INVENTION

This invention has been proposed in view of the abovementioned disadvantages inherent in conventional roasters to be used in spit-roasting operations within restaurants and to suitably improve them, and is also directed toward providing a spit roaster employing charcoal as a heat source; wherein the caloric or heat output of the charcoal fire is adapted to be easily controlled and wherein also a large amount of the smoke and harmful gas which may be generated during the use of the charcoal fire are adapted to be exhausted to a location near the source of generation, thereby preventing pollution of the environment; and wherein cleaning of each part is rendered possible since the roaster is designed to be easily disassembled.

SUMMARY OF THE INVENTION

For the purpose of overcoming the above-mentioned problems and achieving the intended object, a spit roaster is provided according to this invention, comprising:

a body having an opening communicating with an exhaust duct, formed at the center of the bottom of the body, and an air supply path defined at both ends relative to the longitudinal direction of the body and having an upper and a lower opening, a range case removably housed within the above body with required clearances therearound;

a range removably housed within the above range case and having a charcoal receiving space defined therein and support members disposed at both ends relative to the longitudinal direction of the body for supporting members upon which materials to be cooked are to be disposed; and smoke exhaust frames communicating with the above exhaust duct, removably disposed within the vicinity of the upper opening of an exhaust space defined between the rear side wall of the range case and the body, and having a smoke exhausting inlet defined within the front side thereof and facing toward the range case.

According to the split roaster of this invention, cooking in a favorable environment is feasible since large amounts of smoke and harmful gas generated during use of the the roaster are exhausted at a location near the source of generation. Furthermore, the present spit roaster has advantages in that it provides an extremely easy control mechanism for the caloric force or heat output of the charcoal fire while requiring only simplified daily maintenance, since it has an overall structure which can be easily disassembled. Moreover, heat insulaation achieved between the body and the range obviates overheating of the surface of the body. Accordingly, operators are protected from being burned even if they should inadvertently touch the body of the roaster.

Various other objects, features, and attendant advantages of the present invention will become better understood from the following detailed description, when considered in conjunction with the accompanying drawings, in which like reference characters designate like or corresponding parts throughout the several views, and wherein:

DETAILED DESCRIPTION OF THE INVENTION

Next, the spit roaster according to this invention will be described hereinafter by means of a preferred embodiment with reference being made to the accompanying drawings.

Figure 3:
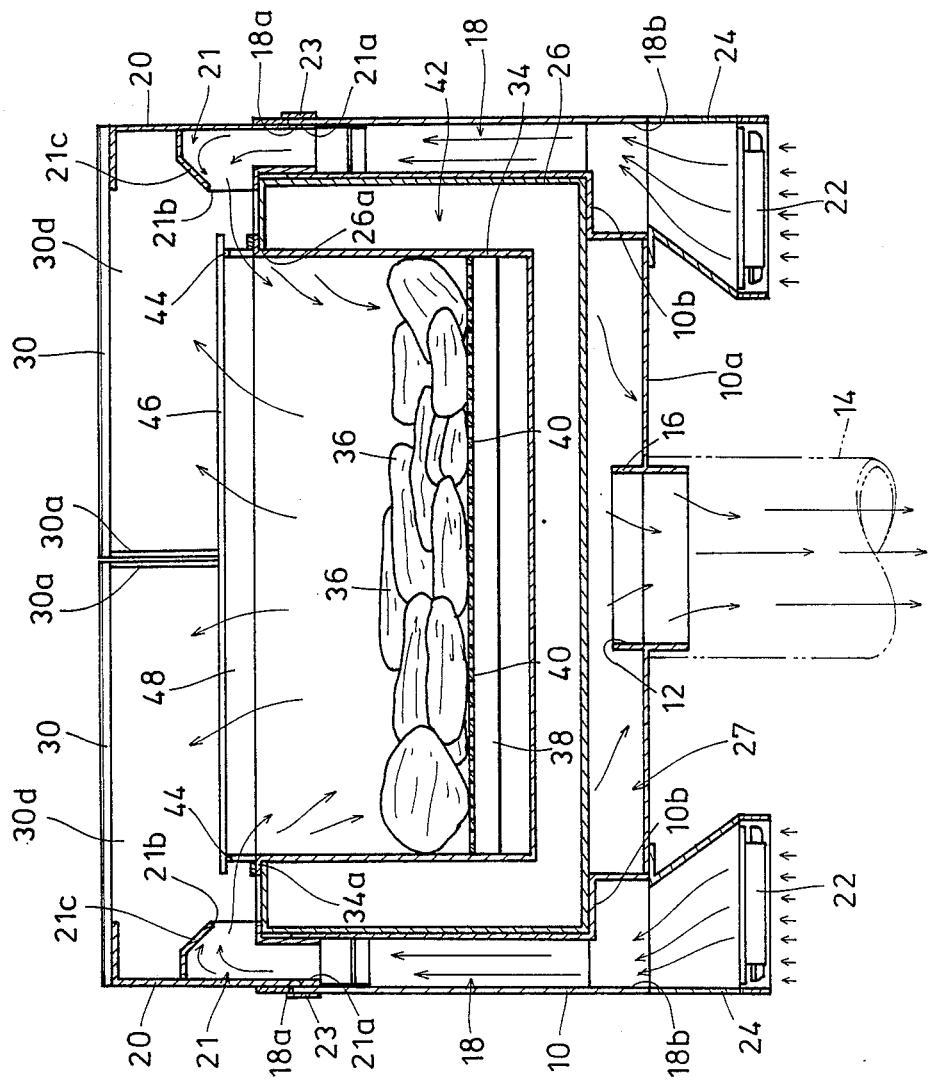
FIG. 3 is a cross-sectional view taken along the line III—III in FIG. 2.

In the figures, numeral 10 designates a body of a roaster. The body 10 constitutes a rectangular box made of a metallic material such as stainless steel which is free from the generation of rust and may not be easily contamined with deposits. The body 10 has a rectangular opening at the top and a circular opening 12 defined within the bottom 10, the circular opening 12, as shown in FIG. 3, being removably connected to a smoke exhaust duct 14 so as to communicate with each other as described later. Along the periphery of the circular opening 12 there is provided an upstanding wall 16 having a predetermined height, so that a predetermined amount of water may be contained within the bottom of the body, whereby oil or meat juice which may drop during the process of spit roasting can be collected thereon.

Figure 2:
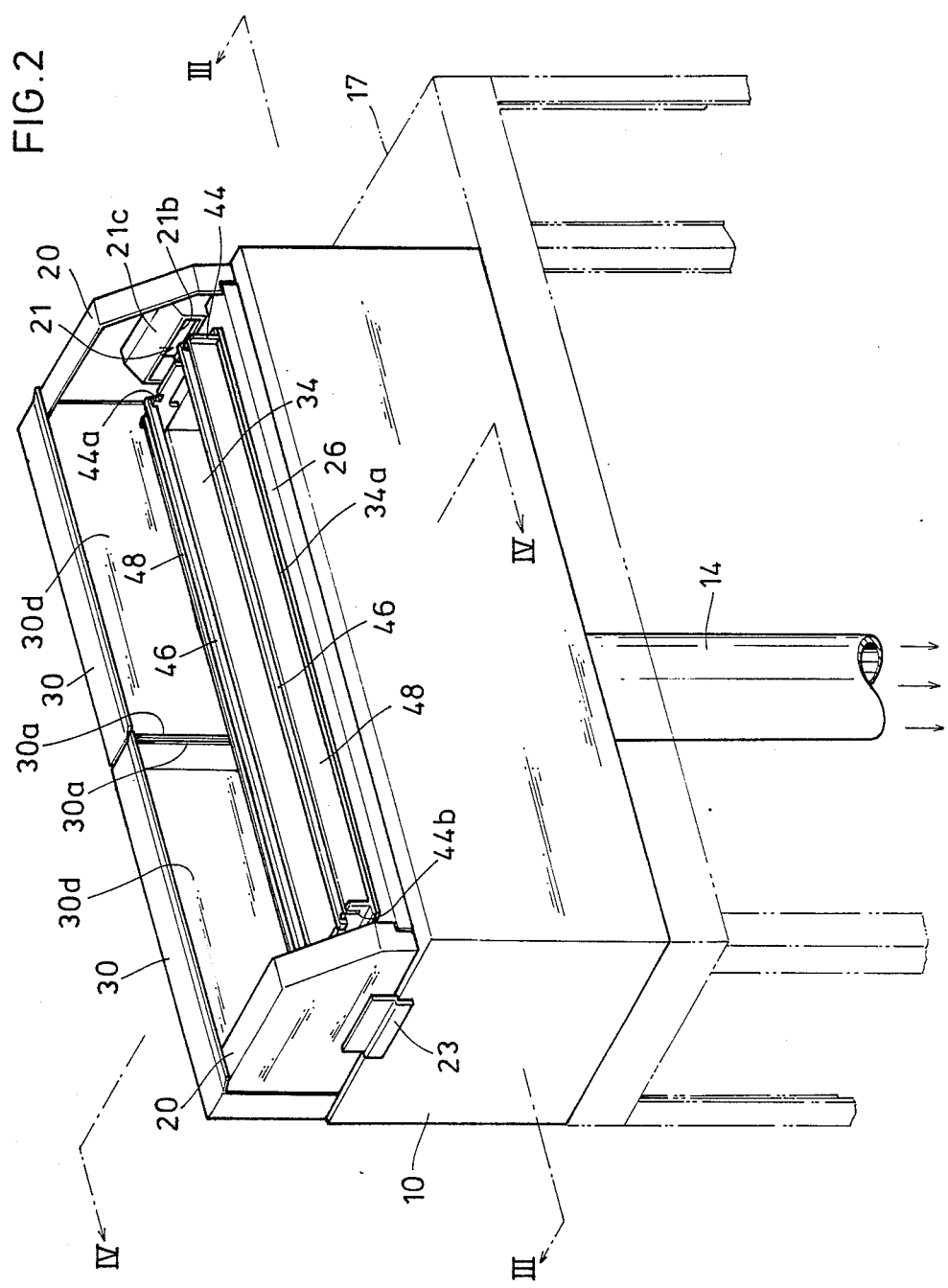
FIG. 2 is a perspective view illustraating the state wherein the roaster is set upon a stand frame and connected to an exhaust duct.

Incidentially, the body 10 is adapted to be used by being mounted upon a sand frame 17 of a predetermined shape, as shown in FIG. 2. A device or gauge is preferably provided upon the front side of the body so that the amount of water to be containedd within the bottom of the body can be monitored.

At both ends of the body 10 relative to the longitudinal direction thereof, a path 18 open at the top and bottom ends is formed, respectively. A side cover 20 to be described later is removably fitted within the vicinity of the upper opening 18a of this path 18, and air air supply duct 24 equipped with a blower 22 to be described later is fixed within the vicinity of the lower opening 18b. Outer air is adapted to be supplied to a arange 34 (to be described later) through means of each path 18 and each side cover 20 by means of each blower 22.

Figure 1:
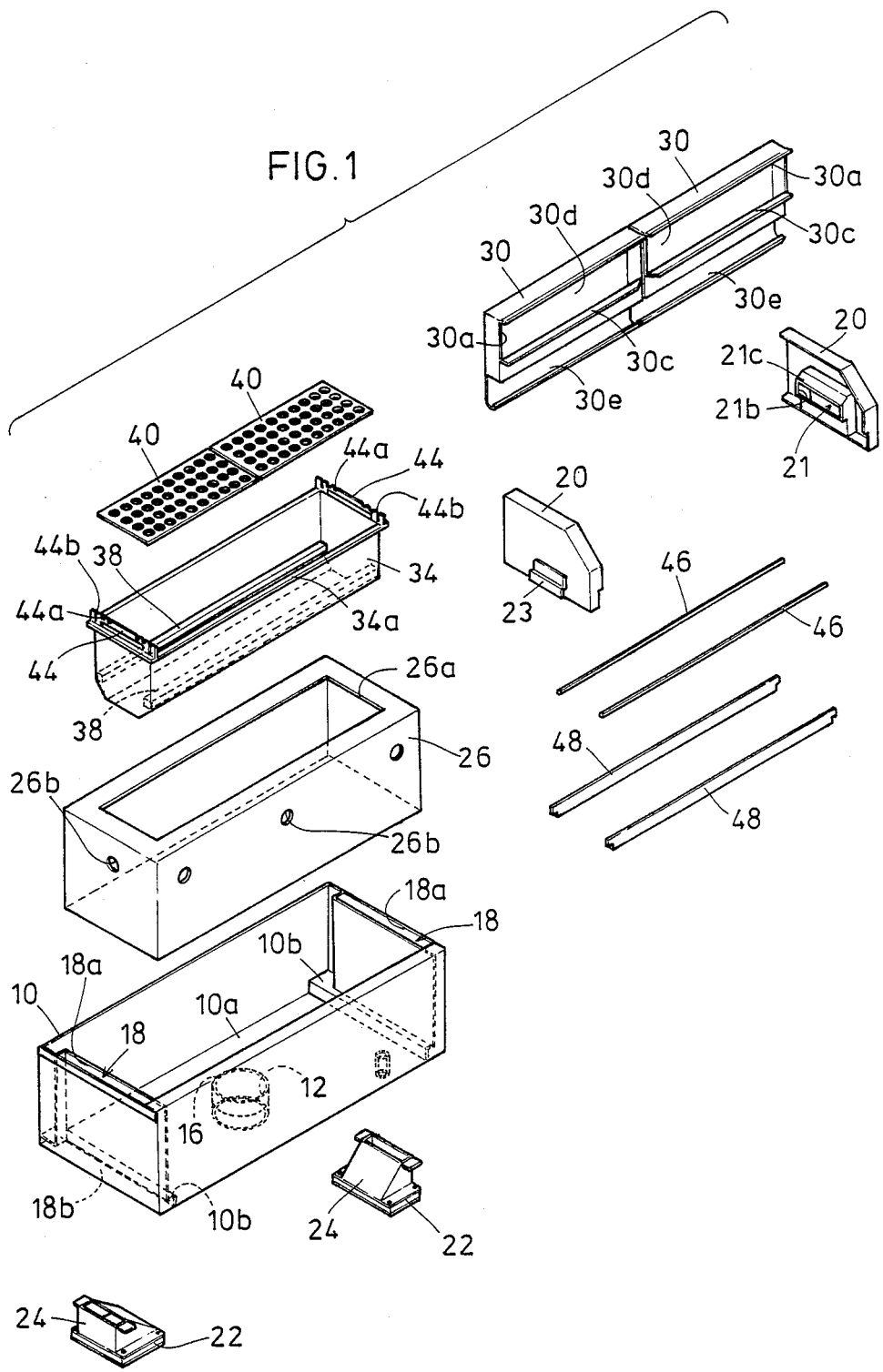
FIG. 1 is an exploded perspective view of the essential components of the spit roaster according to a preferred embodiment of this invention.
Figure 4:
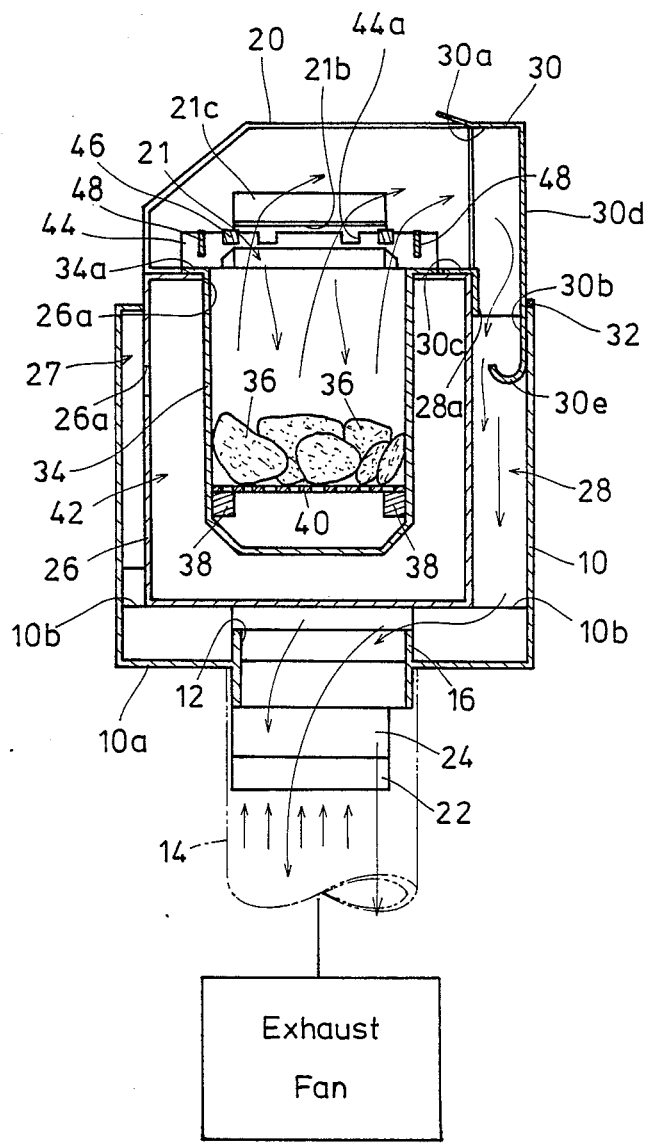
FIG. 4 is a cross-sectional view taken along the line IV—IV in FIG. 2.

As shown in FIG. 1, steps 10b extending inwardly are formed within the body 10 at both end portions of the bottom thereof relative to the longitudinal direction (inside of the paths 18). Upon these steps 10b a range case 26 is placed. This range case 26 constitutes a rectangular box having dimensions such that a space for heat insulation 27 having required dimensions may be formed between the internal wall surface of the body 10 and the external wall surface of the range case 26 when the range case 26 is housed within the body 10 as best seen in FIGS. 3 and 4. An exhaust space 28 is also defined between the internal surface of the rear wall of the body 10 and the external surface of the rear wall of the range case 26 and it is designed to exhaust smoke generated from the burning charcoal through the exhaust duct 14 to an exterior location, as best seen in FIG. 4.

Incidentially, a plurality of through holes 26b are formed within the side walls of the range case 26 so as to allow communication of the internal space of the range case 26 with the space for heat insulation 27.

In FIG. 3, numeral 34 designates a range which houses charcoal 36 and wherein the charcoal 36 is ignited and burned. This range 34 is composed of a material which is resistant to various conditions produced by means of the burning charcoal 36. The range 34 made of a metal as shown in the embodiment has parallel 38 support bars formed the side plates thereof and extending along the longitudinal direction thereof at a predetermined level above the bottom such thaat grates 40 can be removably place upon these support bars 38. The range 34 is adapted to be inserted through the rectangular opening 26 formed within the supper surface of the range case 26 so that the range 34 may be removably supported by means of the range case 26 through means of an upper flange 34a as best been in FIG. 4. The range 34 is also designed to have dimensions so as to define a space for heat insulation 42 between the external wall surface thereof and the internal wall surface of the range case 26 when the former is disposed within the latter, whereby heat generated by means of the burning may not be conducted to the range case 26 and the body 10.

Incidentially, if the range 34 is constructed from a fire-resistant material such as those used for ordinary charcoal ranges in place of a metal, clearances for the heat insulation need not be formed between the range 34 and the range case 26. In this case, the range case 26 also serves to reinforce the range 34.

As shown in FIG. 1, handles 44 are formed upon upper edges 34a at both ends of the range 34 relative to he longitudinal direction thereof and these handles 44 are used for inserting the range 34 into the range case 26 or removing the range 34 from the range case 26. Along the upper edge of each handle a plurality of recesses 44a are formed with a predetermined distance defined therebetween, the recesses being designed for supporting opposite ends of square-shaped rods 46 extending across the range 34 in the longitudinal direction, respectively. Meat is adapted to be roasted by laying the spits supporting the meat across a pair of square rods 46 extending parallel with respect to each other with a predetermined distance defined therebetween. Slits 44b are also formed within the outer side portions of each handle 44, and shrouds 48 have opposite ends thereof inserted within opposed the slits 44b so as to extend in the longitudinal direction, respectively. The shrouds 48, as will be described later, serve to prevent hot ir disposed beneaath the material being cooked from being exhasted when smoke generated during cooking is exhausted through means of smoke exhaust frames 30.

As shown in FIG. 4, two smoke exhaust frames 30 are removably mounted within in an upper opening 28a of the exhaust space 28. These smoke exhaust frames 30 each constitute a rectangular frame as shown in FIG. 4 and have a width such that they may be fitted within the exhaust space 28. The front face of the smoke exhaust frame 30 (the side facing toward the range case 26) opens to define a smoke inlet 30a, and an opening 30b is formed upon the bottom of the smoke exhaust frame 30 so as to communicate with the exhaust space 28. The lower end of the smoke inlet 30a of the smoke exhaust frame 30 is bent so as to extend forwardly and form a supporting member 30c, so that the smoke exhaust frame 30 may be supported upon the range case 26 and the upper end face of the body 10 through means of the supporting member 30c and projections 32 formed upon the rear surface of each smoke exhaust frame 30 when the lower end of each smoke exhaust frame 30 is disposed upon the upper opening 28a of the exhaust space 28.

Furthermore, a rear wall 30d of each smoke exhaust frame 30 extendsd below the bottom opening 30b thereof so as to define a hooked end portion thereof which forms an oil receiver 30e. This oil receiver 30e serves to collect oil or fat, or the like be deposited upon the rear wall 30d by means of the smoke exhausted through means of the smoke exhaust frame 30.

The side covers 20 to be removably fitted upon the upper openings 18a of the paths 18 of the body 10 have a width which allows insertion within the upper openings 18a and which also position the same through means of engagement of stoppers 23 provided upon the rear surface of the side covers 20, upon the upper edge of the body 10.

Upon the wall surface of each side cover 20 facing toward the range 34, a guide path 21 is defined so as to communicate with the path 18 through means of a lower opening 21a as shown in FIG. 3. A blow-off port 21b is formed upon the side of the guide path 21 facing toward the range 34. Incidentally, a top plate member 21c defining the guide path 21 is beveled downwardly toward the blow-off port 21b, whereby the air supplied upwardly will be blown out essentially horizontally from the blow-off port 21b.

To the lower opening 18b of each path 18, there is connected an air supply duct 24 having a shape as shown in FIG. 1 so as to communicate therewith, and a blower 22 is deposited within to this air supply duct 24. As shown in FIG. 3, as a result of the upward flow of air along paths 18 by means of the actuation of each blower 22, outer air is adapted to be supplied to the charcoal 36 disposed within the range 34 through means of the air supply duct 24, the air supply path 18 and the guide path 21 defined within the side cover 20. Since each blower 22 is disposed at each end portion of the body 10 relative to the longitudinal direction thereof, the caloric force or heat output of the charcoal 36 can be controlled by adjusting the amount of air to be supplied to the charcoal 36 by driving actuating both or one of the blowers. If a variable speed blower is used, more deliberate caloric control can be achieved.

Each of the components described above comprises a separate structural component and they are assembled into a roaster before use as shown in FIGS. 3 and 4. To describe such assembly in detail, the range case 26 is entirely housed within the body 10 so as to define the space for heat insulation 27 between the internal wall surface of the body 10 and the external wall surface of the range case 26. The range 34 is suspendingly housed with the range case 26 through means of the upper flange 34a, and the space for heat insulation 42 is defined between the external wall surface of the range 34 and the internal wall surface of the range case 26.

The exhaust space 28 defined behind the range case 26 fluidically communicates with the smoke exhaust duct 14 disposed beneath the bottom of the body 10. The smoke exhaust duct 14 has a filter (not shown) disposed interiorly thereof, whereby oil, dust and the like are collected and only smoke is exhausted through means of the smoke exhaust duct 14 to an external environment.

Smoke exhaust frames 30 are fitted to the upper opening 28a of the exhaust space 28, and side covers 20 are mounted within the upper openings 18a of the air flow paths 18 defined within the body 10. The space above the range 34 is thus hedged along both sides and the rear side, so that smoke may not diffuse outwardly therefrom in such directions. Incidentally, a predetermined amount of water is supplied to the bottom of the body 10 before use.

Furthermore, while a pair of square rods 46 are placed across the handles 44 of the range 34 (see FIG. 2), a predetermined amount of preliminarily ignited charcoal 36 is placed within the range 34 before placing these rods 46 upon the handles 44.

In using this spit roaster, preliminarily ignited charcoal 36 is deposited within the range 34 and the blowers 22 are actuated so as to supply fresh outer air to the charcoal 36 disposed within the range 34 through means of the air supply ducts 24 in order to facilitate complete ignition and combustion of the charcoal. Furthermore, the caloric force or heat output of the charcoal fire can be controlled as desired merely by using either one or both of the blowers 22, or controlling the speed of the blowers 22 so as to adjust the amount of air to be supplied into the range 34.

When the spit-roasting operation is started, most of the oily components and juice dripping from the meat during cooking fall onto the charcoal fire and generate smoke. In this process, negative pressure or vacuum exhaust is developed within the smoke exhaust space 28 due to the forced exhaust of the air through means of the smoke exhaust duct 14. Accordingly, a greater portion of the smoke generated will be introduced into the exhaust space 28 through means of the smoke exhaust frames 30, whereby pollution of the cooking space and dining rooms of the restaurant can be prevented. Incidentally, shrouds 48 disposed upon the handles 44 prevent hot air generated from the charcoal and disposed beneath the material being cooked from being inhaled means of the smoke exhaust frames 30 so as to prevent a reduction in the calaoric force or heat output of the charcoal fire.

When the smoke passes through the smoke exhaust frames 30, most of the oily and fatty components or carbon components are deposited onto the rear wall 30d of the smoke exhaust frames 30. However, even when the oily and fatty components and the like deposited upon this rear wall 30d drop off, they will be received by means of the oil receiver 30e formed along the lower end of the rear wall 30d, and thus most of the oily and fatty components and the like will be removed by means of the smoke exhaust frame 30. Residual oily components and other ccontaminants still contained within the smoke will be by being adsorbed by means of the water contained within the bottom of the body 10, so that only the smoke components are exhausted through means of the smoke exhaust duct 14 and the circular opening 12. If contaminants such as debris, dust, or the like are exhausted through means of the smoke exhaust duc 14 together with the smoke, they may be collected upon the filter, whereby disadvantageous contamination of he internal surfaces of the duct with oil may be obviated.

Moreover, since two spaces for insulation 27 and 42 are defined between the range case 26 and the body 10, and between the range 34 and the range case 26, respectively, overheating of the body surfce may effectively be prevented, and in addition the hot air disposed within the space for heat insulation 42 is exhausted by means of the smoke exhaust duct 14 through means of the through holes 26a of the range case 26 and the space for heat insulation 27 so as to be exhausted to an external environment.

Ash formed after combustion of the charcoal drops through the grates 40 disposed within the lower part of the range 34 so as to be collected at the bottom thereof.

In this invention, while an embodiment of performing spit roasting has been described nonlimitataively, the present roaster can of course be used suitably for roasting fish, lobsters, an the like for example by placing a grill upon the top of the range.

Obviously, many modifications and variations of the present invention are possible in light of the above teachings. It is therefore to be understood that within the scope of the appended claims, the present invention may be practiced otherwise than as specifically described herein.

What is claimed is:

1. A spit roaster, comprising:
   an outer housing having a substantially rectangular parallelepiped configuration defined by means of a bottom wall, upstanding end walls connected at lower portions thereof to said bottom wall, and upstanding front and rear walls connected at lower portions thereof to said bottom wall and also having side edge portions connected to corresponding side edge portions of said upstanding end wall;
   a range housing, disposed within said outer housing, having a substantially rectangular parallelepiped configuration defined by means of a bottom wall, upstanding end walls connected at lower portions thereof to said bottom wall, and upstanding front and rear walls connected at lower portions thereof to said bottom wall and also having side edge portions connected to corresponding side edge portions of said upstanding end walls;
   a range, disposed within said range housing, having a substantially rectangular parallelepiped configuration defined by means of a bottom wall for supporting cooking charcoal, upstanding end walls connected at lower portions thereof to said bottom wall, and upstanding front and rear walls connected at lower portions thereof to said bottom wall and also having side edge portions connected to corresponding side edge portions of said upstanding end walls;
   air supply means defined within said end walls of said outer housing for introducing outside combustion air into said range for combustion of said cooking charcoal disposed within said range;
   exhaust duct means defined within said bottom wall of said outer housing for exhausting smoke, generated during a cooking operation, from said range to a location external to said roaster;
   means defining a smoke exhaust flow path within a rear portion of said roaster and fluidically connecting said range to said exhaust duct means for conducting said smoke, generated within said range during said cooking operation, from said range to said exhaust duct means; and
   means fluidically connected with said exhaust duct means for generating a negative pressure within said exhaust duct means so as to exhaust said smoke, generated within said range during said cooking operation, through said smoke exhaust flow path and said exhaust duct means to said location external to said roaster.

2. A spit roaster as set forth in claim 1, wherein:
   said means for generating a negative pressure within said exhaust duct means comprises an exhaust fan.

3. A spit roaster as set forth in claim 1, wherein:
   said each of said end walls of said outer housing comprises an inner wall member and an outer wall member spaced outwardly from said inner wall member; and
   said air supply means comprises an air duct defined between said inner and outer wall memberes.

4. A spit roaster as set forth in claim 3, wherein:
   each of said air ducts is open at both upper and lower ends thereof;
   air outlet port means aare fluidically connected to said upper ends of said air ducts for discharging said combustion air substantially horizontally into said range; and
   blower means are disposed within said lower ends of sasid air ducts for forcing said combustion air through said ducts and said air outlet port means into said range.

5. A spit roaster as set forth in claim 1, wherein:
   said front wall of said range housing is spaced inwardly from said front wall of said outer housing so as to define an insulation space therebetween.

6. A spit roaster as set forth in claim 1, wherein:
   said rear walls of said range housing is spaced inwardly from said rear wall of said outer housing so as to define said smoke exhaust flow path therebetween.

7. A spit roaster as set forth in claim 1, wherein:
   said bottom wall, said end walls, and said front and rear walls of said range are spaced inwardly from said bottom wall, said end walls, and said front and rear walls, respectively, of said range housing so as to define insulation spaces therebetween.

8. A spit roaster as set forth in claim 7, wherein:
   said front wall of said range housing is spaced inwardly from said front wall of said outer housing so as to define an insulation space therebetween; and
   through-holes are defined within said front wall of said range housing for providing communication of said insulation space defined between said outer housing and said range housing with said insulation spaces defined between said range housing and said range.

9. A spit roaster as set forth in claim 1, further comprising:
   grate means disposed within said range for supporting said cooking charcoal within said range.

10. A spit roaster as set forth in claim 1, further comprising:
    support means provided within upper end portions of said end walls of said range for supporting food spit bars upon which food to be cooked is able to be supported.

11. A spit roaster as set forth in claim 1, further comprising:
    means disposed within said smoke exhaust flow path for collecting oil and fat entrained within said smoke being exhausted through said smoke exhaust flow path.

12. A spit roaster as set forth in claim 11, wherein:
    said means for collecting said oil and fat comprises a substantially cup-shaped oil receiver mounted upon said rear wall of said outer housing and projecting inwardly into said smoke exhaust flow path.
13. A spit roaster as set forth in claim 1, wherein:
said outer housing is fabricated from stainless steel.
14. A spit roaster as set forth in claim 1, wherein:
an upper end portion of said exhaust duct means projects above said bottom wall of said outer housing so as to define with said bottom, end, front, and rear walls of said outer housing a water reservoir within which water, having a predetermined depth, may be housed for collecting oil and fat originally entrained within said smoke being exhausted from said roaster through said exhaust duct means.
15. A spit roaster as set forth in claim 1, wherein:
said exhaust duct means is defined within a central portion of said bottom wall of said outer housing.

* * * * *